(12) United States Patent
Chen et al.

(10) Patent No.: US 11,487,022 B2
(45) Date of Patent: Nov. 1, 2022

(54) 3D POINT CLOUD MAP ALIGNMENT WITH OPEN STREET MAP FOR OUTDOOR 6D LOCALIZATION ON MOBILE PLATFORMS

(71) Applicant: Black Sesame International Holding Limited, Santa Clara, CA (US)

(72) Inventors: Yu Chen, San Jose, CA (US); Guan Wang, San Jose, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 453 days.

(21) Appl. No.: 16/706,318

(22) Filed: Dec. 6, 2019

(65) Prior Publication Data
US 2021/0173094 A1  Jun. 10, 2021

(51) Int. Cl.
G01S 19/00 (2010.01)
G01S 19/45 (2010.01)
G06T 7/70 (2017.01)

(52) U.S. Cl.
CPC .............. *G01S 19/45* (2013.01); *G06T 7/70* (2017.01); *G06T 2207/10024* (2013.01); *G06T 2207/10028* (2013.01); *G06T 2207/30244* (2013.01)

(58) Field of Classification Search
CPC . G01S 19/45; G06T 7/70; G06T 2207/10024; G06T 2207/10028; G06T 2207/30244

USPC ........................................................ 701/445
See application file for complete search history.

(56) References Cited

U.S. PATENT DOCUMENTS

2019/0234746 A1 * 8/2019 Zhang ..................... G06K 9/00
2020/0068345 A1 * 2/2020 Ondruska ............. G01S 5/0284

* cited by examiner

*Primary Examiner* — Tyler J Lee
*Assistant Examiner* — Tiffany P Ohman
(74) *Attorney, Agent, or Firm* — Timothy T. Wang; Ni, Wang & Massand, PLLC

(57) ABSTRACT

A method of mapping and localization is disclosed that includes, reconstructing a point cloud and a camera pose based on VSLAM, synchronizing the camera pose and a GPS timestamp at a first set of GPS coordinate points and transforming the first set of GPS coordinate points corresponding to the GPS timestamp into a first set of ECEF coordinate points. The method also includes determining a translation and a rotation between the camera pose and the first set of ECEF coordinate points, transforming the point cloud and the camera pose into a second set of ECEF coordinates based on the translation and the rotation and transforming the point cloud and the camera pose into a second set of GPS coordinate points. The method further includes constructing and storing a key-frame image, a key-frame timestamp and a key-frame GPS based on the second set of GPS coordinate points.

6 Claims, 7 Drawing Sheets

3D POINT CLOUD MAP ALIGNMENT WITH OPEN STREET MAP FOR OUTDOOR 6D LOCALIZATION ON MOBILE PLATFORMS

BACKGROUND

Technical Field

The instant disclosure is related to three dimensional (3D) outdoor napping systems and specifically 3D point cloud map alignment with open street map for outdoor six dimensional (6D) localization on a mobile platform.

BACKGROUND

In the self-driving car domain, there are four main computational portions; localization, perception, planning, and control. Currently, self-driving cars are equipped with expensive real-time kinematic global positioning system (RTK-GPS) light detection and ranging (LiDAR) and inertial measurement units (IMU). In this configuration, RTK-GPS and IMU data are fused to achieve higher frequency localization and global positioning system (GPS) and LiDAR data are utilized for 6D mapping. These methods are expensive and computationally intensive, leading to detection and localization delays.

Therefore, to better assist human drivers, a possible solution is proposed to fill the gap between systems based on expensive sensors yielding computationally intensive data, and instead utilizing a fusion of low cost sensor data to provide high performance and low cost mapping and localization for a self-driving car.

SUMMARY

A first example method of mapping and localization, comprising, reconstructing a point cloud based on visual simultaneous localization and mapping (VSLAM), reconstructing a camera pose based on VSLAM, synchronizing the camera pose and a global position system (GPS) timestamp at a first set of GPS coordinate points, transforming the first set of GPS coordinate points corresponding to the GPS timestamp into a first set of earth centered, earth fixed (ECEF) coordinate points, determining a translation and a rotation between the camera pose and the first set of ECEF coordinate points, transforming the point cloud and the camera pose into a second set of ECEF, coordinates based on the translation and the rotation, transforming the point cloud and the camera pose into a second set of GPS coordinate points, constructing a key-frame image, a key-frame timestamp and a key-frame GPS based on the second set of GPS coordinate points and storing the second set of GPS coordinate points of the point cloud and the camera pose, the key-frame image, the key-frame timestamp and the key-frame GPS.

A second example method of mapping and localization, comprising, synchronizing a set of timestamps of a set of sensor data including a set of GPS coordinates, assigning a closest GPS timestamp corresponding to the set of GPS coordinates to the set of sensor data, fusing the set of sensor data based on a Kalman filter to synthesize a set of high-frequency location data, reconstructing a point cloud and a camera pose based on VSLAM, resealing the point cloud and the camera pose, transforming the resealed point cloud and camera pose into an IMU point cloud and an inertial measurement units (IMU) camera pose, transforming the IMU point cloud and the IMU camera pose into a north-east-down (NED) point cloud and a NED camera pose, transforming the NED point cloud and the NED camera pose into a GPS point cloud and a UPS camera pose, constructing a key-frame OPS based on the set of UPS coordinates and storing the GPS point cloud, the GPS camera pose, the key-frame GPS and the closest GPS timestamp.

A third example method of mapping and localization, comprising, synchronizing a set of timestamps of a set of sensor data including a set of GPS coordinates, assigning a closest GPS timestamp corresponding to the set of UPS coordinates to the set of sensor data, fusing the set of sensor data based on a Kalman filter to synthesize a set of high-frequency location data, reconstructing a point cloud and a camera pose based on VSLAM, resealing the point cloud and the camera pose, transforming the resealed point cloud and camera pose into an IMU point cloud and an IMU camera pose, transforming the IMU point cloud and the IMU camera pose into a NED point cloud and a NED camera pose, transforming the NED point cloud and the NED camera pose into a GPS point cloud and GPS camera pose, determining a range of key-frame images based on the set of GPS coordinates associated with the closest GPS timestamp, selecting a current image as a candidate key-frame image within the range of key-frame images, constructing a key-frame GPS based on the set of GPS coordinates and the key-frame candidate image, constructing a key-frame image based on the key-frame candidate image and storing the GPS point cloud, the GPS camera pose, the key-frame image, the key-frame GPS and the closest timestamp.

DESCRIPTION OE THE DRAWINGS

DETAILED DESCRIPTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
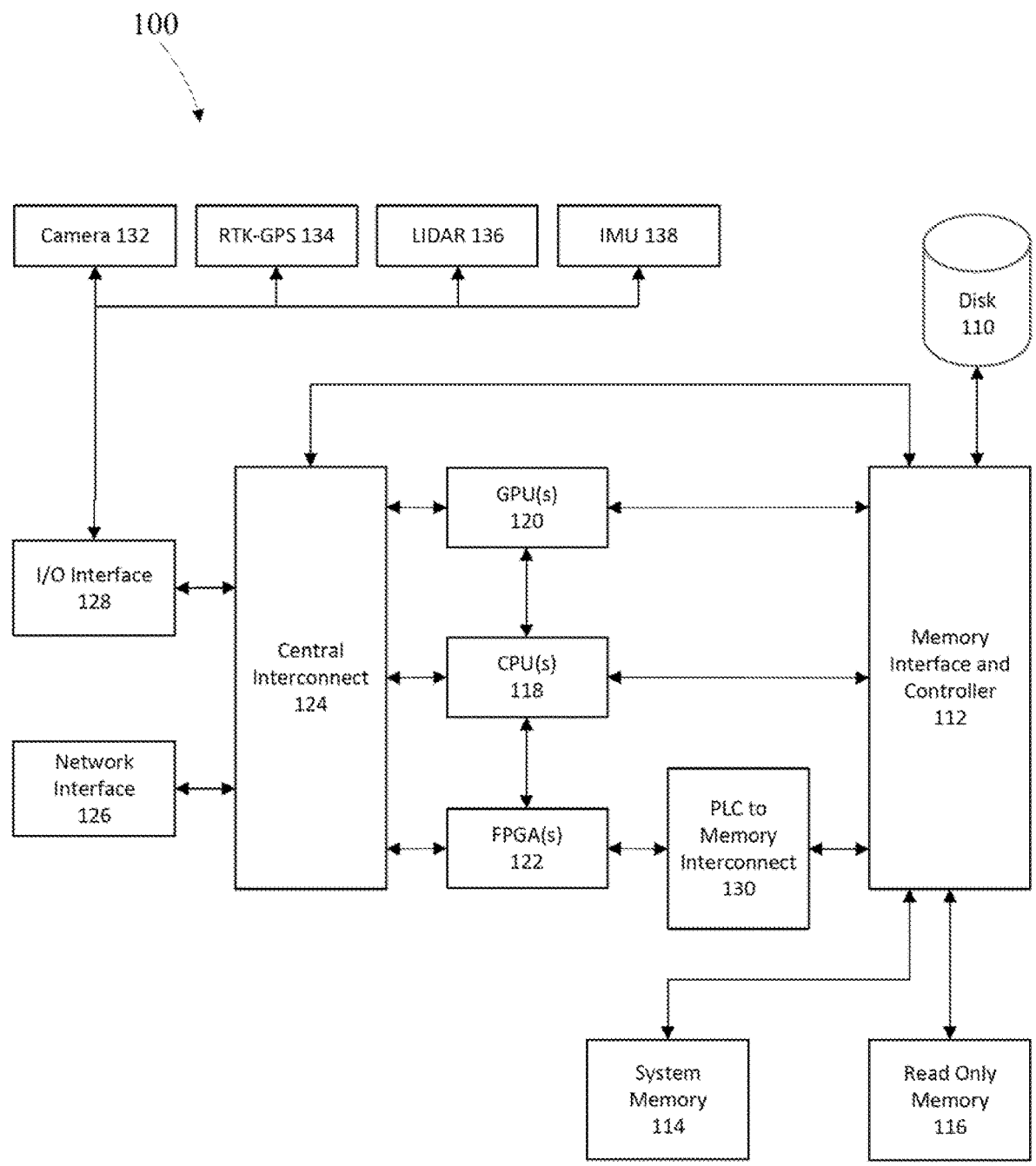
FIG. 1 is a first example system diagram in accordance with one embodiment of the disclosure.

FIG. 1 depicts an example automated parking assistance system 100 that may be used to implement deep neural nets associated with the operation of one or more portions or steps of processes 700 and 800. In this example, the processors associated with the hybrid system comprise a field programmable gate array (FPGA) 122, a graphical processor unit (GPU) 120 and a central processing unit (CPU) 118.

The processing units 118, 120 and 122 have the capability of providing a deep neural net. A CPU is a general processor that may perform many different functions, its generality leads to the ability to perform multiple different tasks, however, its processing of multiple streams of data is limited and its function with respect to neural networks is very limited. A CPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are specialized for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected to one other and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

Figure 2:
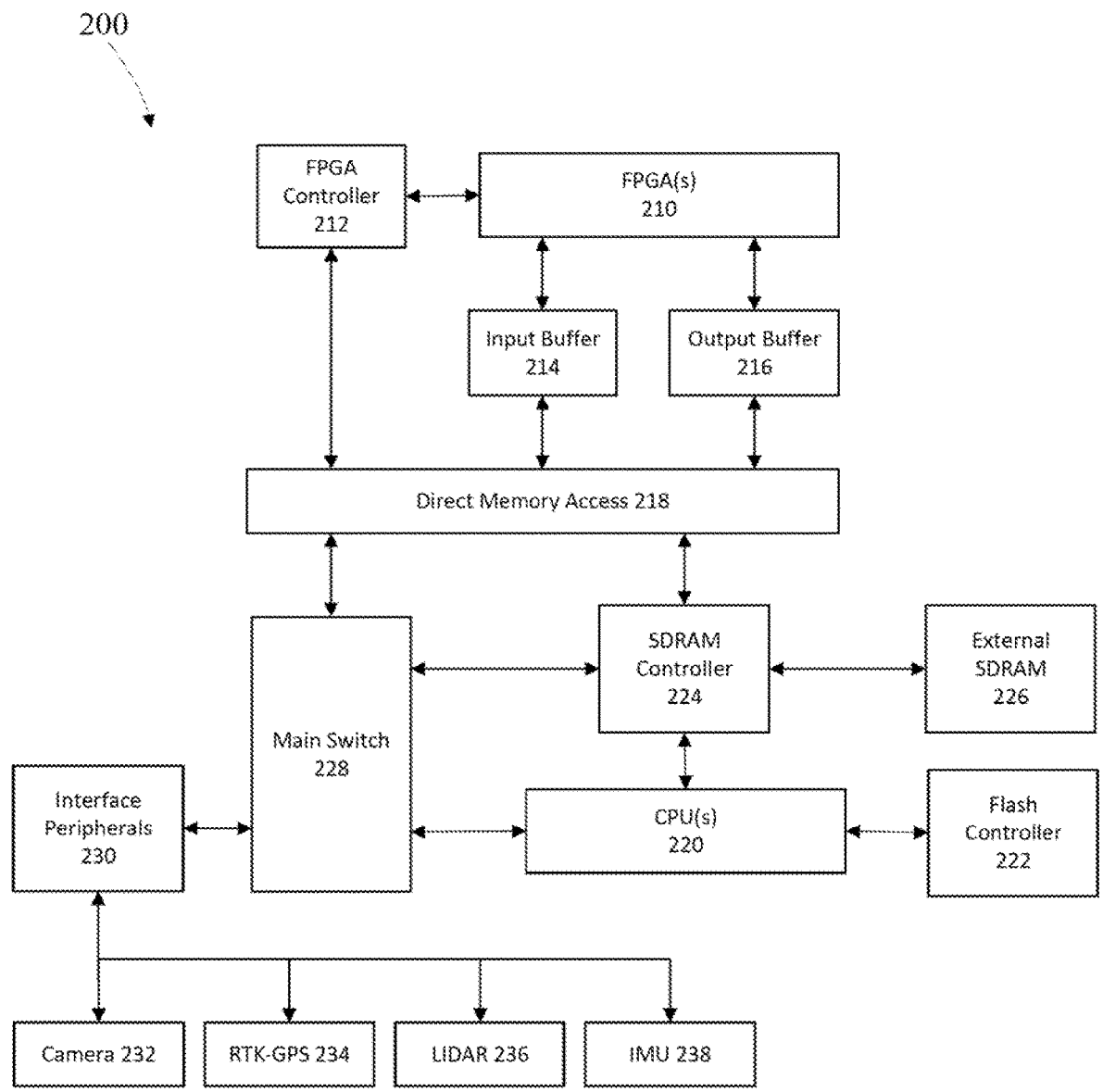
FIG. 2 is a second example system diagram in accordance with one embodiment of the disclosure.

The system of FIG. 2 may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 connected to camera 132, RTK-GPS 134, LiDAR 136 and IMU 138 and the network interface 126.

FIG. 2 depicts a second example hybrid computational system 200 that may be used to implement neural nets associated with the operation of one or more portions or steps of flow 500. In this example, the processors associated with the system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, the boilers are coupled to the FPGA to buffer data into and out of the FPGA respectively. The DMA 218 has two first in first out (FIFO) buffers one for the host. CPU and the other for the FPGA, the DMA allows data to be written to and read from the appropriate buffer.

On the CPU side of the DMA are a main switch 228 which shuttles data and commands to the DMA. The DMA is also connected to a synchronous dynamic random access memory (SDRAM) controller 224 which allows data to be shuttled to and from the FPGA to the CPU 220, the SDRAM controller is also connected to external SDRAM 226 and the CPU 220. The main switch 228 is connected to the peripherals interface 230 connected to camera 232, RTK-GPS 234, LiDAR 236 and IMU 238. A flash controller 222 controls persistent memory and is connected to the CPU 220.

Definitions

Visual simultaneous localization and mapping (VSLAM) constructs a map of an unknown area while simultaneously tracking a vehicle's location within that area.

Three dimensional (3D) point clouds are made up of multiple georeferenced points that may provide a high resolution external outline of data points in space.

Six dimensional (6D) pose estimation is the data related to the location and orientation of an object, a location of the object would be a 3D location, the orientation would also be a 3D orientation, together the location and orientation provide a 6D representation of the object.

Red, Blue, Green, Depth (RGBD) provides a visual representation of an object and the depth perception of the object, beyond the visual representation.

Camera pose estimation is the regression of data to provide an absolute camera pose from an RGB image based on learning-based pose estimation methods.

A global positioning system (GPS) timestamp is the time at which a location was determined.

Earth centered, Earth fixed (ECEF) is a geographic and Cartesian coordinate system also known as a conventional terrestrial system. ECEF represents X, Y and Z coordinates from the center of mass of the Earth. The X, Y and Z axes are aligned with the international reference pole and international reference meridian that are fixed with respect to Earth's surface.

The Cartesian coordinate system of GPS is called Earth-Centered, Earth-Fixed (ECEF). ECEF uses three-dimensional (3D) XYZ coordinates to describe the location of a GPS user. The term Earth-Centered comes from the fact that the origin of the axis (0, 0, 0) is located at the mass center of gravity of the Earth.

The World Geodetic System (WGS) is a standard for use in cartography, geodesy, and satellite navigation including GPS. This standard includes the definition of the coordinate system's fundamental and derived constants. The coordinate origin of WGS84 is meant to be located at the Earth's center of mass.

The north-east-down (NED) system is a non-inertial system with its origin fixed at the vehicle's center of gravity. Its axes are oriented along the geodetic directions defined by the Earth's surface.

The x-axis points north parallel to the geoid surface, in the polar direction, the y-axis points east parallel to the geoid surface, along a latitude curve and the z-axis points downward, toward normal to the Earth's surface.

A key-frame is a fixed reference frame taken when GPS information is available. A key-frame is a location on a timeline which marks the beginning or end of a transition. A key-frame contains information that defines where a transition starts or stops.

Example Block Diagrams

Figure 3:
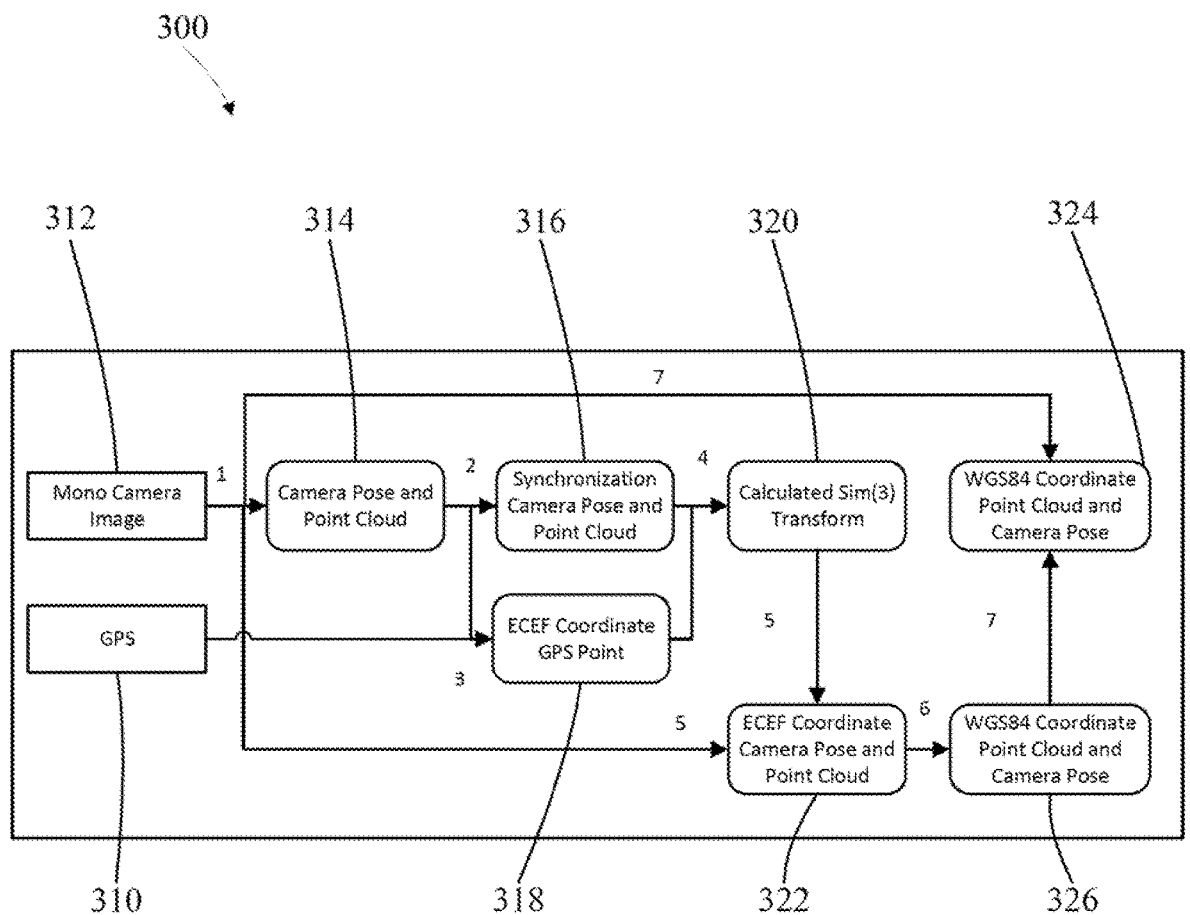
FIG. 3 is a first example logic flow diagram in accordance with one embodiment of the disclosure.

FIG. 3 discloses a first flow block diagram of mapping and localization depicting a mono camera image 312 utilized to reconstruct 314 a 3D point cloud and 6D camera pose. The GPS data 310 and the reconstruction 314 of the 3D point cloud and 6D camera pose are sent to a synchronization module 316 which synchronizes the 3D point cloud and 6D camera pose with GPS time stamps from GPS data 310. GPS data 310 is sent to an Earth centered, Earth fixed (ECEF) transformer 318. The output of the synchronization module 316 and the ECEF transformer 318 are sent to a SIM transformer 320. The output of the SIM transformer 320 and the mono camera image 312 are sent to an ECEF transformer 322 to coordinate the 3D point cloud and 6D camera pose. The output of the EDT transformer 322 is sent to a GPS coordinate point transformer 326 to transform the 3D point cloud and 6D camera pose into GPS coordinates. The output of the GPS coordinate point transformer 326 and the mono camera image 312 are sent to a final GPS coordinate point transformer 324 for final conversion, yielding a 3D point cloud and 6D camera pose utilized for mapping and localization.

FIG. 3 depicts an example method of mapping and localization construction utilizing GPS and camera pose alignment including, utilizing VSLAM to reconstruct the mono image sequence 3D point cloud and 6D camera pose. The method synchronizes the 6D camera pose with GPS time stamps based on the GPS data. The method includes transforming GPS coordinate points to ECEF coordinate points and determining the responding translation and rotation between the 6D camera pose and the transformed coordinate point results. The method transforms the 3D point cloud and 6D camera pose to ECEF coordinate based on the translation and rotation results. The method includes transforming the 3D point cloud and 6D camera pose into WGS84 (GPS) coordinate points and storing the results from the transformed WGS84 3D point cloud and 6D camera pose and responding key frame image, time stamps and GPS of this frame into a database for further localization.

Figure 4:
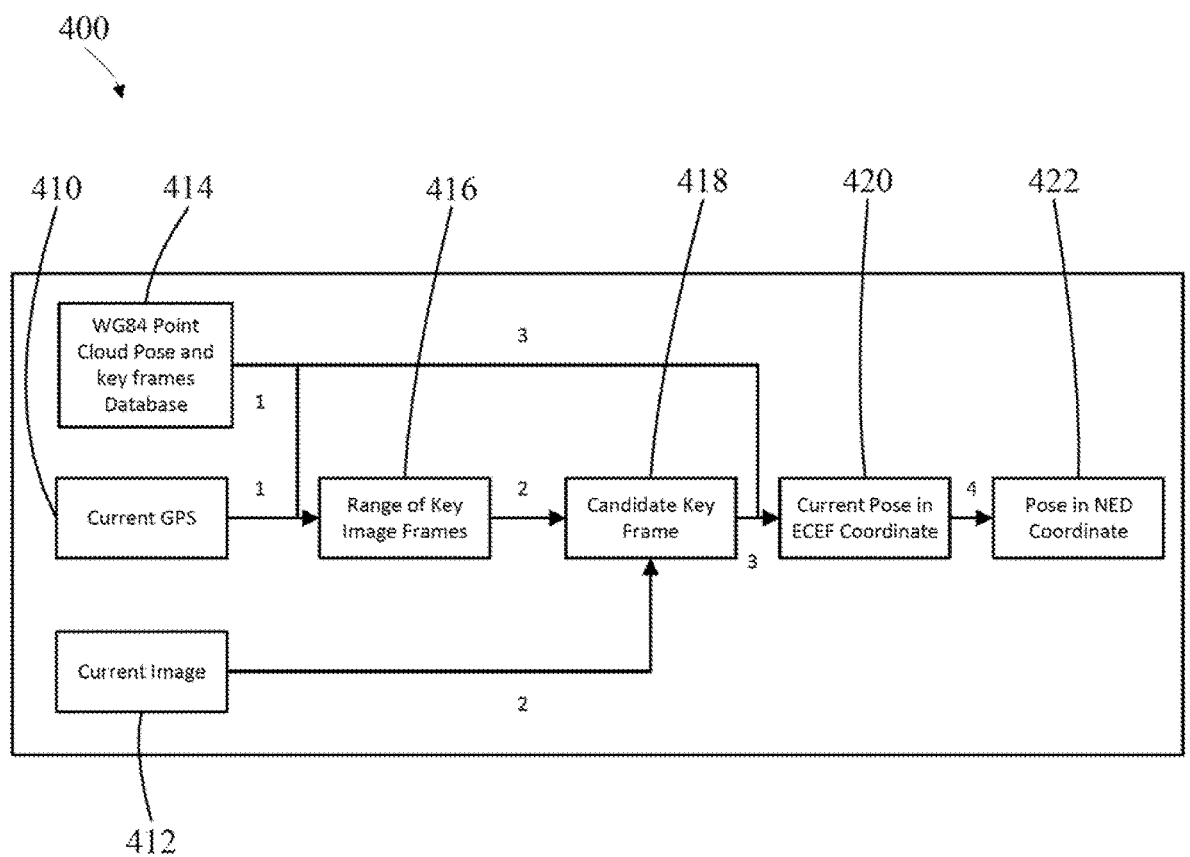
FIG. 4 is a second example logic flow diagram in accordance with one embodiment of the disclosure.

FIG. 4 discloses a second flow block diagram of mapping and localization depicting inputting current GPS data 410 and GPS based point cloud, camera pose and key-frame data 414 into a key-frame range detector 416 that identities a range of potential key-frames. The output of the key-frame range detector 416 and a current image 412 are utilized by a key frame candidate detector 418 to identify candidate key-frames. The output of the key frame candidate detector 418 and the GPS based point cloud, camera pose and key-frame data 414 are utilized to determine a current camera pose in ECEF coordinates 420, this camera pose is subsequently transformed into NED coordinates 422.

In another example method of mapping and localization, the method includes receiving from a database GPS based 3D point cloud 6D camera pose and key-frame data, this data is synchronized with current GPS data based on a closest GPS time stamp to the sensor data, GPS, IMU, accelerometer and gyroscopic data are fused via a Kalman filter to obtain higher frequency GPS coordinates. VSLAM is utilized to reconstruct the 3D point cloud and 6D camera pose, the results of which are resealed by a depth estimation module. The resealed 3D point cloud and 6D camera pose are transformed into IMU coordinates. The transformed IMU coordinates are transformed into NED coordinates utilizing a magnetometer. The NED based 3D point cloud and 6D camera pose are transformed into WGS84 (GPS) coordinates. The GPS based 3D point cloud, 6D camera pose and key-frame are stored for further localization.

Example Method Flows

In this section we give a brief overview of the general flows for mapping and localization. A deep neural network is used to predict mapping and localization.

Figure 5:
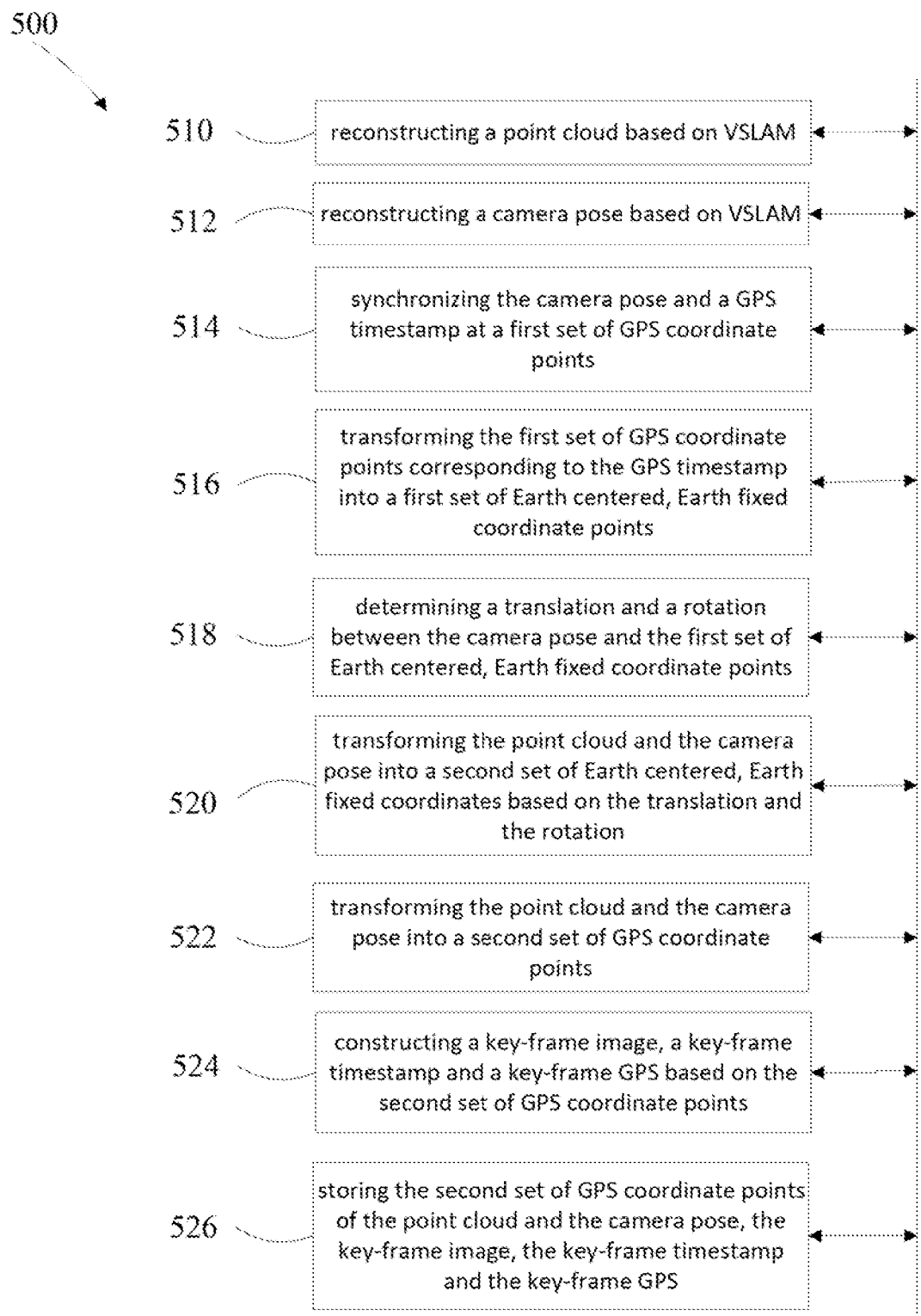
FIG. 5 is a first example method of mapping and localization in accordance with one embodiment of the disclosure.

FIG. 5 depicts first method of mapping and localization, including, reconstructing 510 a point cloud based on VSLAM, reconstructing 512 a camera pose based on VSLAM and synchronizing 514 the camera pose and a GPS timestamp at a first set of GPS coordinate points. The method includes transforming 516 the first set of GPS coordinate points corresponding to the GPS timestamp into a first set of Earth centered, Earth fixed coordinate points, determining 518 a translation and a rotation between the camera pose and the first set of Earth centered, Earth fixed coordinate points and transforming 520 the point cloud and the camera pose into a second set of Earth centered, Earth fixed coordinates based on the translation and the rotation. The method additionally includes transforming 522 the point cloud and the camera pose into a second set of GPS coordinate points, constructing 524 a key-frame image, a key-frame timestamp and a key-frame GPS based on the second set of GPS coordinate points and storing 526 the second set of GPS coordinate points of the point cloud and the camera pose, the key-frame image, the key-frame timestamp and the key-frame GPS.

Further localizing may be based on the second set of GPS coordinate points. The point cloud is three dimensional, the camera pose is six dimensional, the GPS coordinate points may be WGS84 and the visual SLAM may be based on a mono camera image.

Figure 6:
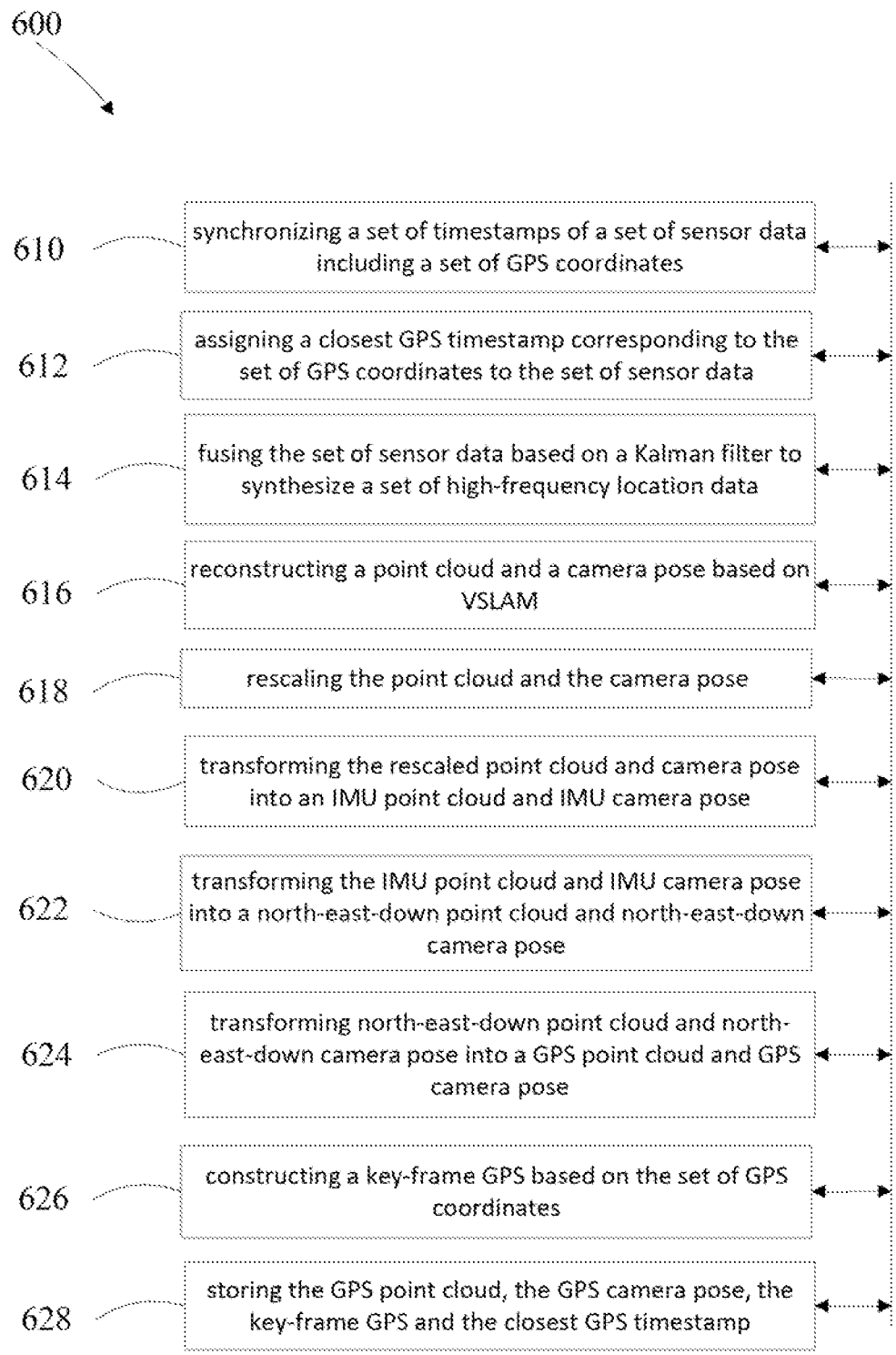
FIG. 6 is a second example method of mapping and localization in accordance with one embodiment of the disclosure.

FIG. 6 depicts a second method of mapping and localization, including, synchronizing 610 a set of timestamps of a set of sensor data including a set of GPS coordinates, assigning 612 a closest GPS timestamp corresponding to the set of GPS coordinates to the set of sensor data and fusing 614 the set of sensor data based on a Kalman filter to synthesize a set of high-frequency location data. The method includes reconstructing 616 a point cloud and a camera pose based on VSLAM, resealing 618 the point cloud and the camera pose and transforming 620 the resealed point cloud and camera pose into an IMU point cloud and IMU camera pose. The method also includes transforming 622 the IMU point cloud and IMU camera pose into a north-east-down point cloud and north-east-down camera pose transforming 624 north-east-down point cloud and north-east-down camera pose into a GPS point cloud and GPS camera pose, constructing 626 a key-frame GPS based on the set of GPS coordinates and storing 628 the GPS point cloud, the GPS camera pose, the key-frame GPS and the closest GPS timestamp.

Further localizing may be based on the stored set of GPS coordinate points. The point cloud is three dimensional, the camera pose is six dimensional, the GPS coordinate points may be WGS84 and the visual SLAM may be based on a mono camera image.

Figure 7:
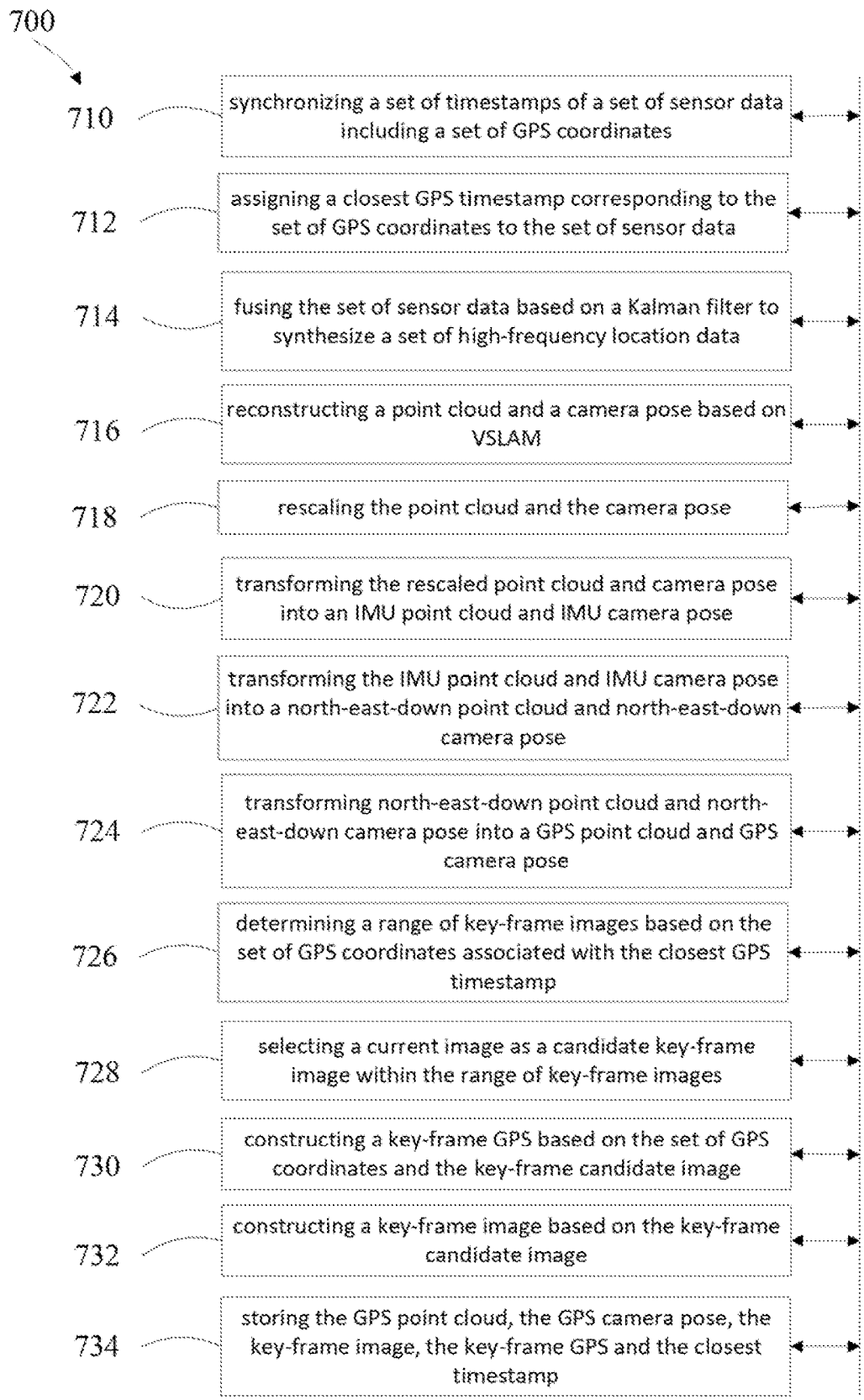
FIG. 7 is a third example method of mapping and localization in accordance with one embodiment of the disclosure.

FIG. 7 depicts a third method of mapping and localization, including, synchronizing 710 a set of timestamps of a set of sensor data including a set of GPS coordinates, assigning 712 a closest GPS timestamp corresponding to the set of GPS coordinates to the set of sensor data and fusing 714 the set of sensor data based on a Kalman filter to synthesize a set of high-frequency location data. The method also includes reconstructing 716 a point cloud and a camera pose based on VSLAM, resealing 718 the point cloud and the camera pose and transforming 720 the resealed point cloud and camera pose into an IMU point cloud and IMU camera pose. The method includes transforming 722 the IMU point cloud and IMU camera pose into a north-east-down point cloud and north-east-down camera pose, transforming 724 north-east-down point cloud and north-east-down camera pose into a GPS point cloud and GPS camera pose and determining 726 a range of key-frame images based on the set of GPS coordinates associated with the closest GPS timestamp. The method further includes selecting 728 a current image as a candidate key-frame image within the range of key-frame images, constructing 730 a key-frame GPS based on the set of GPS coordinates and the key-frame candidate image, constructing 732 a key-frame image based on the key-frame candidate image and storing 734 the GPS point cloud, the GPS camera pose, the key-frame image, the key-frame GPS and the closest timestamp.

Further localizing may be based on the stored set of GPS coordinate points. The point cloud is three dimensional, the camera pose is six dimensional, the GPS coordinate points may be WGS84 and the visual SLAM may be based on a mono camera image.

Those of skill in the art would appreciate that the various illustrative blocks, modules, elements, components, methods, and algorithms described herein may be implemented as electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more, Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for". Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of mapping and localization, comprising:
synchronizing a set of timestamps of a set of sensor data including a set of GPS coordinates;
assigning a closest GPS timestamp corresponding to the set of GPS coordinates to the set of sensor data;
fusing the set of sensor data based on a Kalman filter to synthesize a set of high-frequency location data;
reconstructing a point cloud and a camera pose based on VSLAM;
rescaling the point cloud and the camera pose;
transforming the rescaled point cloud and camera pose into an IMU point cloud and an IMU camera pose;
transforming the IMU point cloud and the IMU camera pose into a NED point cloud and a NED camera pose;
transforming the NED point cloud and the NED camera pose into a GPS point cloud and a GPS camera pose;
determining a range of key-frame images based on a current set of GPS coordinates associated with the closest GPS timestamp;
constructing a key-frame GPS based on the set of GPS coordinates; and
storing the GPS point cloud, the GPS camera pose, the key-frame GPS and the closest GPS timestamp.

2. The method of claim 1, further comprising selecting a current image as a candidate key-frame image within the range of key-frame images.

3. A method of mapping and localization, comprising:
synchronizing a set of timestamps of a set of sensor data including a set of GPS coordinates;
assigning a closest GPS timestamp corresponding to the set of GPS coordinates to the set of sensor data;
fusing the set of sensor data based on a Kalman filter to synthesize a set of high-frequency location data;
reconstructing a point cloud and a camera pose based on VSLAM;
rescaling the point cloud and the camera pose;
transforming the rescaled point cloud and camera pose into an IMU point cloud and an IMU camera pose;
transforming the IMU point cloud and the IMU camera pose into a NED point cloud and a NED camera pose;
transforming the NED point cloud and the NED camera pose into a GPS point cloud and GPS camera pose;
determining a range of key-frame images based on the set of GPS coordinates associated with the closest GPS timestamp;
selecting a current image as a candidate key-frame image within the range of key-frame images;
constructing a key-frame GPS based on the set of GPS coordinates and the key-frame candidate image;
constructing a key-frame image based on the key-frame candidate image; and
storing the GPS point cloud, the GPS camera pose, the key-frame image, the key-frame GPS and the closest timestamp.

4. The method of claim 3, further comprising further localizing based on the GPS point cloud, the GPS camera pose, the key-frame image, the key-frame GPS and the closest timestamp.

5. The method of claim 3, wherein the camera pose is six dimensional.

6. The method of claim 3, wherein the transforming of the IMU point cloud and the IMU camera pose into the NED point cloud and the NED camera pose is based in part on a set of magnetometer data.

* * * * *